(12) United States Patent
Lien

(10) Patent No.: US 7,705,916 B2
(45) Date of Patent: *Apr. 27, 2010

(54) METHOD AND APPARATUS FOR VIDEO DECODING AND DE-INTERLACING

(75) Inventor: Chi-Chin Lien, Taipei (TW)

(73) Assignee: Mediatek, Inc., Hsin-Chu (TW)

( * ) Notice: Subject to any disclaimer, the term of this patent is extended or adjusted under 35 U.S.C. 154(b) by 106 days.

This patent is subject to a terminal disclaimer.

(21) Appl. No.: 12/121,805

(22) Filed: May 16, 2008

(65) Prior Publication Data

US 2008/0212674 A1 Sep. 4, 2008

Related U.S. Application Data

(63) Continuation of application No. 10/605,517, filed on Oct. 5, 2003, now Pat. No. 7,391,469.

(51) Int. Cl.
*H04N 7/01* (2006.01)
*H04N 7/46* (2006.01)

(52) U.S. Cl. .............. 348/448; 348/452; 348/430.1; 348/715

(58) Field of Classification Search .......... 348/448, 348/451, 452, 441, 715, 911, 430.1, 431.1; 382/236, 233; 375/240.01, 240.26; 345/545, 345/547

See application file for complete search history.

(56) References Cited

U.S. PATENT DOCUMENTS

| 6,243,140 | B1 | 6/2001 | Suzuki |
|---|---|---|---|
| 6,392,712 | B1 | 5/2002 | Gryskiewicz |
| 6,437,835 | B1 | 8/2002 | Sakamoto |
| 6,456,329 | B1 | 9/2002 | Tinker |
| 6,515,706 | B1 | 2/2003 | Thompson |
| 6,690,427 | B2 | 2/2004 | Swan |
| 6,831,701 | B2 | 12/2004 | Willis |
| 6,836,293 | B2 | 12/2004 | Itoh |
| 6,912,254 | B2 | 6/2005 | Tsuboi |
| 6,970,206 | B1 | 11/2005 | Swan |
| 7,034,889 | B2 | 4/2006 | Burchard |
| 7,042,512 | B2 | 5/2006 | Yang |
| 7,173,669 | B2 | 2/2007 | Choi |
| 7,228,057 | B2 | 6/2007 | Sugiyama |
| 7,391,469 | B2 * | 6/2008 | Lien .................. 348/448 |

* cited by examiner

*Primary Examiner*—David L Ometz
*Assistant Examiner*—Jean W Désir
(74) *Attorney, Agent, or Firm*—Winston Hsu

(57) ABSTRACT

A method for video decoding in a video decoding/de-interlacing display apparatus that utilizes a storage device having four frame buffers is provided. The method includes following steps: (a) decoding video data of a next picture; (b) if the next picture is a B picture, buffering the decoded video data of the next picture into a frame buffer of the storage device not stored with a reference picture nor a present display picture nor a previous display picture; and (c) if step (b) is not applicable, buffering the decoded video data of the next picture into a frame buffer of the storage device stored with the previous display picture.

22 Claims, 5 Drawing Sheets

| Decoding sequence | Pictures stored in frame buffers ||| Picture to be buffered |
| --- | --- | --- | --- | --- |
| | Present display picture | Previous display picture | Last reference picture | next picture decoded (R4) buffers to : |
| R1R2R3R4 | R2 | R1 | R3 | Remaining buffer |
| R1R2B3R4 | B3 | R1 | R2 | Remaining buffer |
| R1B2R3R4 | R1 | B2 | R3 | Remaining buffer |
| R1B2B3R4 | B3 | B2 | R1 | Remaining buffer |
| R0B......B1R2R3R4 | R2 | R0 | R3 | Remaining buffer |
| R0B......B1R2B3R4 | B3 | R0 | R2 | Remaining buffer |
| R0B......B1R2B3R4 | R0 | B2 | R3 | Remaining buffer |
| R0B......B1B2B3R4 | B3 | B2 | R0 | Remaining buffer |

FIG. 4

| Decoding sequence | Pictures stored in frame buffers | | | Picture to be buffered |
| --- | --- | --- | --- | --- |
| | Present display picture | Previous display picture | Last reference picture | next picture decoded (B4) buffers to: |
| R1R2R3B4 | R2 | R1 | R3,R2 | Remaining buffer |
| R1R2B3B4 | B3 | R1 | R2,R1 | Remaining buffer |
| R1B2R3B4 | R1 | B2 | R3,R1 | Remaining buffer |
| R0B......R1B2B3B4 | B3 | B2 | R1,R0 | Buffer with B2 |
| R0B......B1R2R3B4 | R2 | R0 | R3,R2 | Remaining buffer |
| R0B......B1R2B3B4 | B3 | R0 | R2,R0 | Remaining buffer |
| R0B......B1B2R3B4 | R0 | B2 | R3,R0 | Remaining buffer |
| R-1R0B......B1B2B3B4 | B3 | B2 | R0,R-1 | Buffer with B2 |

FIG. 5

METHOD AND APPARATUS FOR VIDEO DECODING AND DE-INTERLACING

CROSS REFERENCE TO RELATED APPLICATIONS

This continuation application claims the benefit of U.S. patent application Ser. No. 10/605,517, filed on Oct. 5, 2003 and included herein by reference.

BACKGROUND

The invention relates to a method and an apparatus for video decoding and de-interlacing, and more particularly, to a method and an apparatus for video decoding and de-interlacing utilizing a shared storage device.

MPEG2 is a standard that has been proposed for the digital encoding of video signals. MPEG2 allows for signals to be encoded on either an interlaced or progressive basis.

The term interlaced is used to refer to image data that is represented using, e.g., two alternating image fields. One field of an interlaced video frame normally corresponds to the odd lines of pixels in the frame with the other field corresponding to the even lines of the frame. During display, the lines of one field are scanned, e.g., output to a display device. The lines of the second field are then scanned, so that they are interlaced on the display device with the lines of the first field. In this manner, when interlaced images are displayed, odd and even lines of image data are updated on an alternating basis.

In the case of progressive display, image data is displayed sequentially, e.g., starting at the top left corner of an image proceeding to the bottom right corner. Thus, in the progressive display case, the lines of an image are displayed or updated on a sequential basis without lines being skipped.

In a series of progressive video display, the positioning of the horizontal display lines is consistent from image to image. Accordingly, each newly displayed progressive image normally will completely replace the previous image on a display assuming that the images are the same size. In the case of interlaced video display, each frame includes two fields which correspond to spatially different, e.g., horizontal odd and even lines, of a display device. Accordingly, in the case of interlaced images, each field updates only a portion of the displayed image. Because fields of an interlaced image normally correspond to images at different times, merely combining fields 1 and 2 of an interlaced frame can cause blurring and other image distortions when motion is present. For this reason, conversion of interlaced images to progressive images normally involves some form of motion detection and the application of processing which is a function of detected motion.

Presently video images are usually encoded to be displayed as interlaced video. Unfortunately, most recent display devices such as monitors for computers and projectors are designed to display progressive display images.

The ability to efficiently convert between interlaced and progressive image formats continues to increase in importance due, in part, to the ever increasing use of computers. Notably, when television scenes or other data represented as interlaced images are to be displayed on a progressive display, they normally first have to be converted into progressive image data.

High speed memory is normally used in video processing applications which convert between image formats. This is so that real time, or near real time, processing of video data can be achieved. While the cost of memory has dropped considerably in recent years, memory still remains a significant cost component of many image and video processing systems. This is because a relatively large amount of memory is normally required for video applications. In consumer applications and other applications where cost is a concern, it is desirable to minimize the amount of memory required to implement an image processing system or device.

Please refer to FIG. 1. FIG. 1 shows a block diagram of a video display system 100 according to the prior art. The video display system 100 comprises an MPEG2 decoder 110 receiving MPEG2 coded video data streams from a video source (not shown), for decoding the video data to generate decoded video data. In order to execute the decoding function with the decoder 110 smoothly and efficiently, a first memory is coupled to the decoder 110 for video frame buffering. The video display system 100 then comprises an interlaced display unit 125 coupled to the first memory 120. The interlaced display unit 125 is capable of processing decoded image data stored in the first memory 120 for further displaying on an interlaced display (not shown). The video display system 100 also comprises an interlaced/progressive converter 130 coupled to the interlaced display unit 125 for de-interlacing interlaced image data from the interlaced display unit 125 to generate corresponding progressive video data and outputting the converted video data to a progressive display (not shown) for further displaying. Again, in order to execute the de-interlacing function with the converter 130, a second memory 140 is also coupled to the converter 130 for video frame buffering.

For the prior art decoder 110 to perform the decoding function towards different types of video frames, such as I picture frames, P picture frames (together called reference picture frames), and B picture frames, the first memory 120 usually contains storage space for buffering at least three video frames (i.e., six fields). For the interlaced/progressive converter 130 to perform motion detection and as a result switch between intra-field and inter-field interpolation, the second memory 140 then requires storage space for buffering two video frames (i.e., four fields). As a whole, to properly execute designed functions of the prior art video display system 100, the system 100 requires a storage capacity of at least five video frames.

The prior art interlaced/progressive converter 130 usually can perform motion-adaptive de-interlacing operations with video information incorporating not more than four video fields due to the limited storage space of the second memory 140. That is, for each presently displaying frame, switching between intra-field and inter-field interpolation is based on video information of at most four video fields. It is not applicable for the prior art video display system 100 to perform motion-adaptive de-interlacing operations based on an even larger number of fields in order to acquire a more precisely predicted display result.

As can be seen in FIG. 1, operations of the prior art video display system 100 involve data exchange between the first memory 120 and the decoder 110, between the first memory 120 and the interlaced display unit 125, and also between the second memory 140 and the interlaced/progressive converter 130. Therefore a total memory bandwidth requirement of the prior art video display system 100 is considerably large. This is conventionally not desirable for video display system design.

In order to reduce the cost as well as memory bandwidth requirement of video systems that perform decoding and conversion operations, there is a need for methods and an apparatus which allow for a reduction in the amount of memory required to implement such systems. In addition, in order to perform more well-referenced motion-adaptive de-interlacing operations, methods and an apparatus capable of such functionality is also desired. It is desirable that any new methods and apparatus be suitable for implementation in computer systems as well as televisions sets, set top boxes, and other video applications.

SUMMARY

It is therefore one of the objectives of the claimed invention to provide a method and an apparatus for video decoding and de-interlacing utilizing a shared storage device having four frame buffers, to solve the above-mentioned problem.

According to one aspect of the present invention, a method for video decoding in a video decoding/de-interlacing display apparatus that utilizes a storage device having four frame buffers is provided. The method includes: (a) decoding video data of a next picture; (b) if the next picture is a B picture, buffering the decoded video data of the next picture into a frame buffer of the storage device not stored with a reference picture nor a present display picture nor a previous display picture; and (c) if step (b) is not applicable, buffering the decoded video data of the next picture into a frame buffer of the storage device stored with the previous display picture.

According to another aspect of the present invention, a method for video decoding in a video decoding/de-interlacing display apparatus that utilizes a storage device having four frame buffers is provided. The method includes: (a) decoding video data of a next picture; and (b) if the next picture is a reference picture, buffering the decoded video data of the next picture into a frame buffer of the storage device not stored with a last decoded reference picture nor a present display picture nor a previous display picture.

According to yet another aspect of the present invention, an apparatus for video decoding and de-interlacing is provided. The apparatus includes: a video decoder for decoding video data to generate decoded video data of a next picture; a storage device coupled to the video decoder, the storage device having four frame buffers for buffering the decoded video data of the next picture into one of the four frame buffers according to data stored in the frame buffers; an interlace/progressive converter coupled to the storage device, for de-interlacing data stored in the frame buffers to generate corresponding progressive video data according to a first picture and a second picture, wherein the second picture is adjacent to the first picture in display order and one of the first and second pictures is a present display picture; and a controller coupled to the video decoder and the interlace/progressive converter, for controlling data access of the video decoder and the interlace/progressive converter to the frame buffers of the storage device.

According to further aspect of the present invention, a method for video decoding in a video decoding/de-interlacing display apparatus that utilizes a storage device having four frame buffers is provided. The method includes: decoding video data of a next picture; buffering the decoded video data of the next picture into one of the four frame buffers according to data stored in the frame buffers; de-interlacing data stored in the frame buffers to generate corresponding progressive video data according to a first picture and a second picture, wherein the second picture is adjacent to the first picture in display order and one of the first and second pictures is a present display picture; and controlling data access to the frame buffers of the storage device during decoding and de-interlacing.

It is an advantage of the present invention method and apparatus to utilize a shared storage device having only four frame buffers between the video decoder and the interlace/progressive converter. By performing the present invention method, the present invention decoding and de-interlacing apparatus is capable of accomplishing advanced de-interlacing operations such as motion-adaptive de-interlacing or 3-2 pull-down recovery operations with a lower hardware requirement than the prior art decoding and de-interlacing apparatus.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a table indicating decoded video frame buffering strategy according to the present invention.

FIG. 5 is another table indicating decoded video frame buffering strategy according to the present invention.

DETAILED DESCRIPTION

Figure 1:
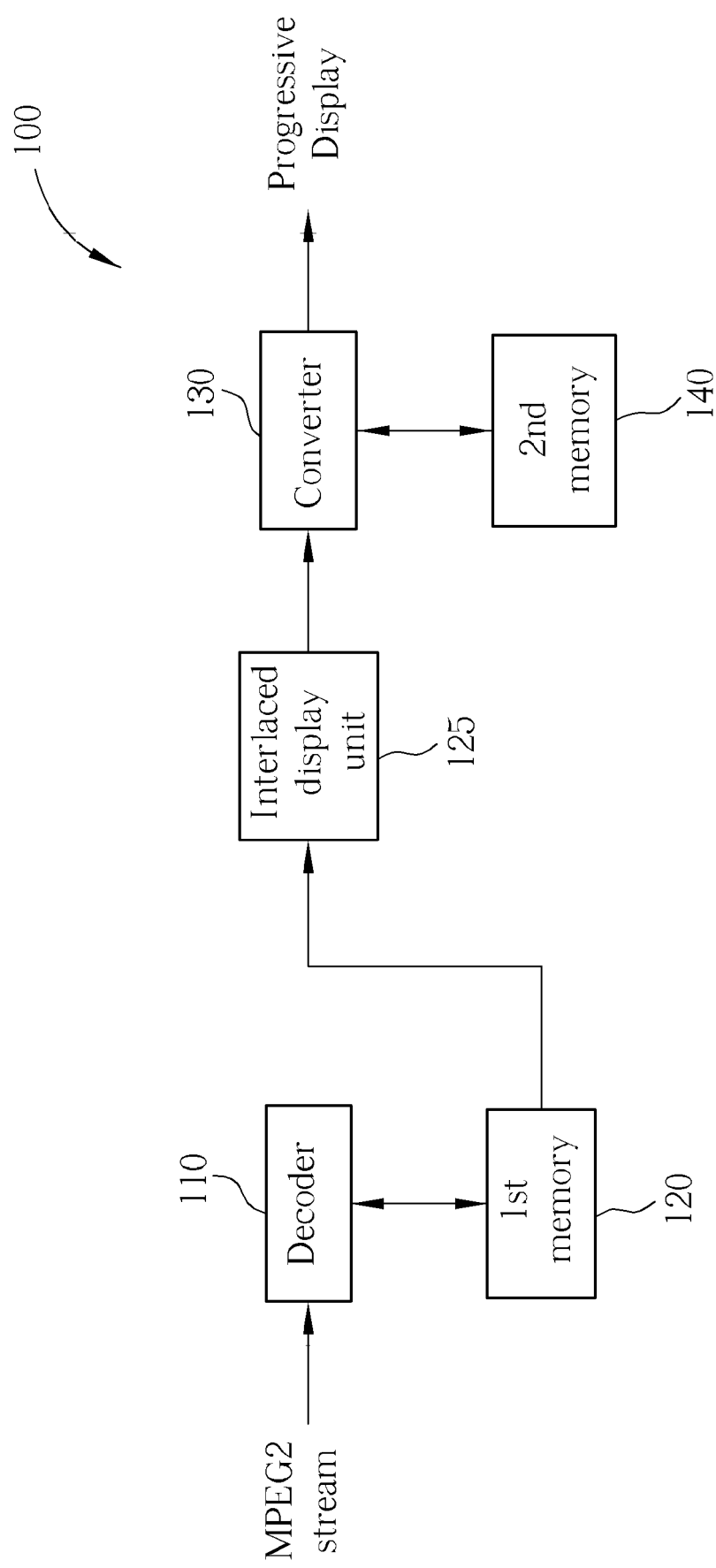
FIG. 1 is a block diagram of a video display system according to the prior art.
Figure 2:
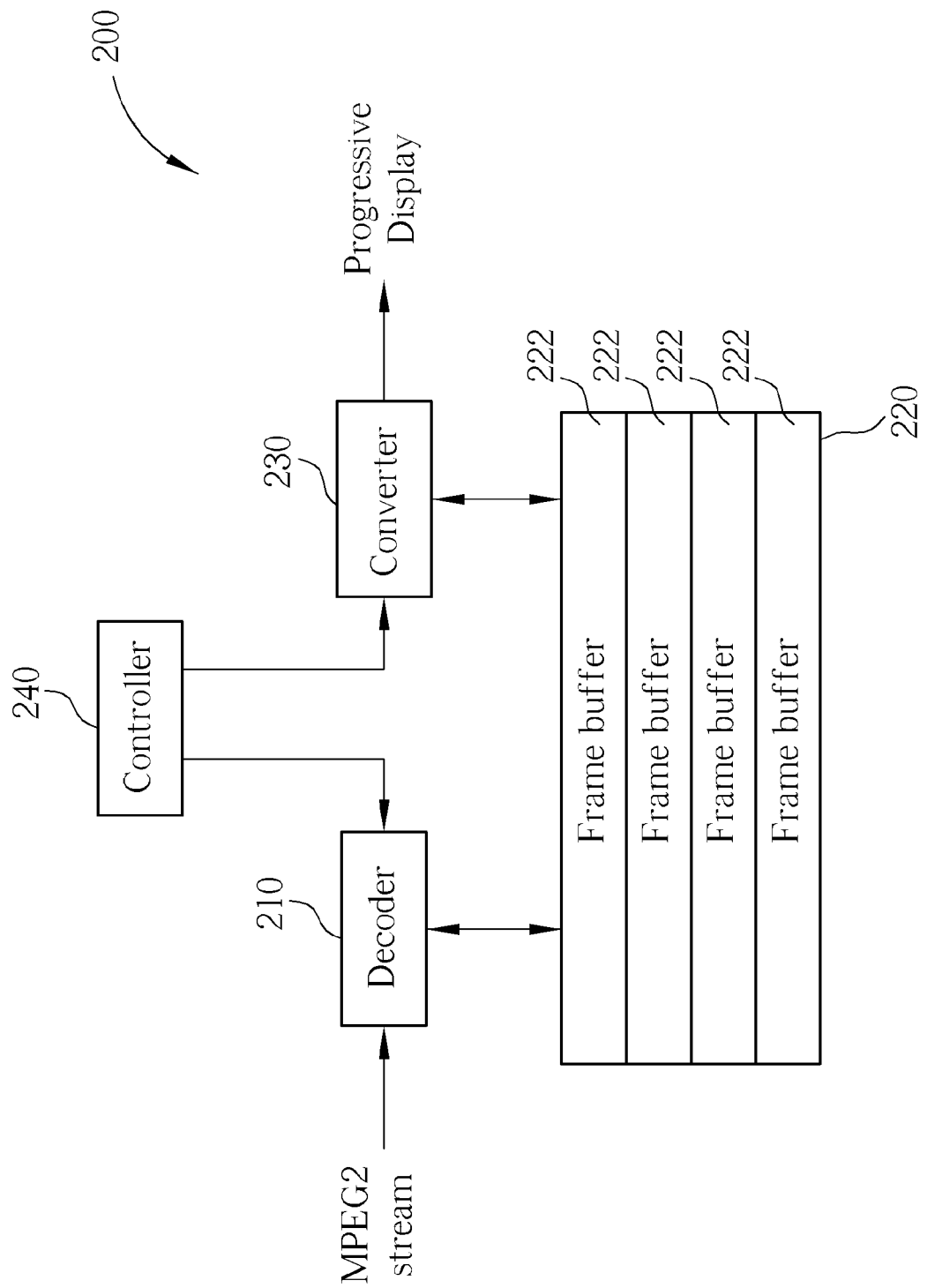
FIG. 2 is a block diagram of an apparatus for video decoding and de-interlacing according to the present invention.

Please refer to FIG. 2. FIG. 2 shows a block diagram of an apparatus 200 for video decoding and de-interlacing according to the present invention. The apparatus 200 comprises a video decoder 210, a storage device 220, an interlace/progressive converter 230, and a controller 240. The video decoder 210 is for decoding video data to generate decoded video data of a next picture. The storage device 220 is coupled to the video decoder 210. The storage device 220 has four frame buffers 222 for buffering the decoded video data of the next picture into one of the four frame buffers 222 according to data stored in the frame buffers 222. The interlace/progressive converter 230 is coupled to the storage device 220 for de-interlacing data stored in the frame buffers 222 to generate corresponding progressive video data. The controller 240 is coupled to the video decoder 210 and the interlace/progressive converter 230 for controlling data access of the video decoder 210 and the interlace/progressive converter 230 to the frame buffers 222 of the storage device 220.

Usually the de-interlaced progressive video data generated by the converter 230 will be directly sent to a progressive display (not shown) for further displaying. However in another embodiment of the present invention, the de-interlaced progressive video data can also be transmitted to another dedicated storage device, such as a DRAM, for storage. Data stored in such a storage device can be later accessed by a progressive display for further displaying.

Figure 3:
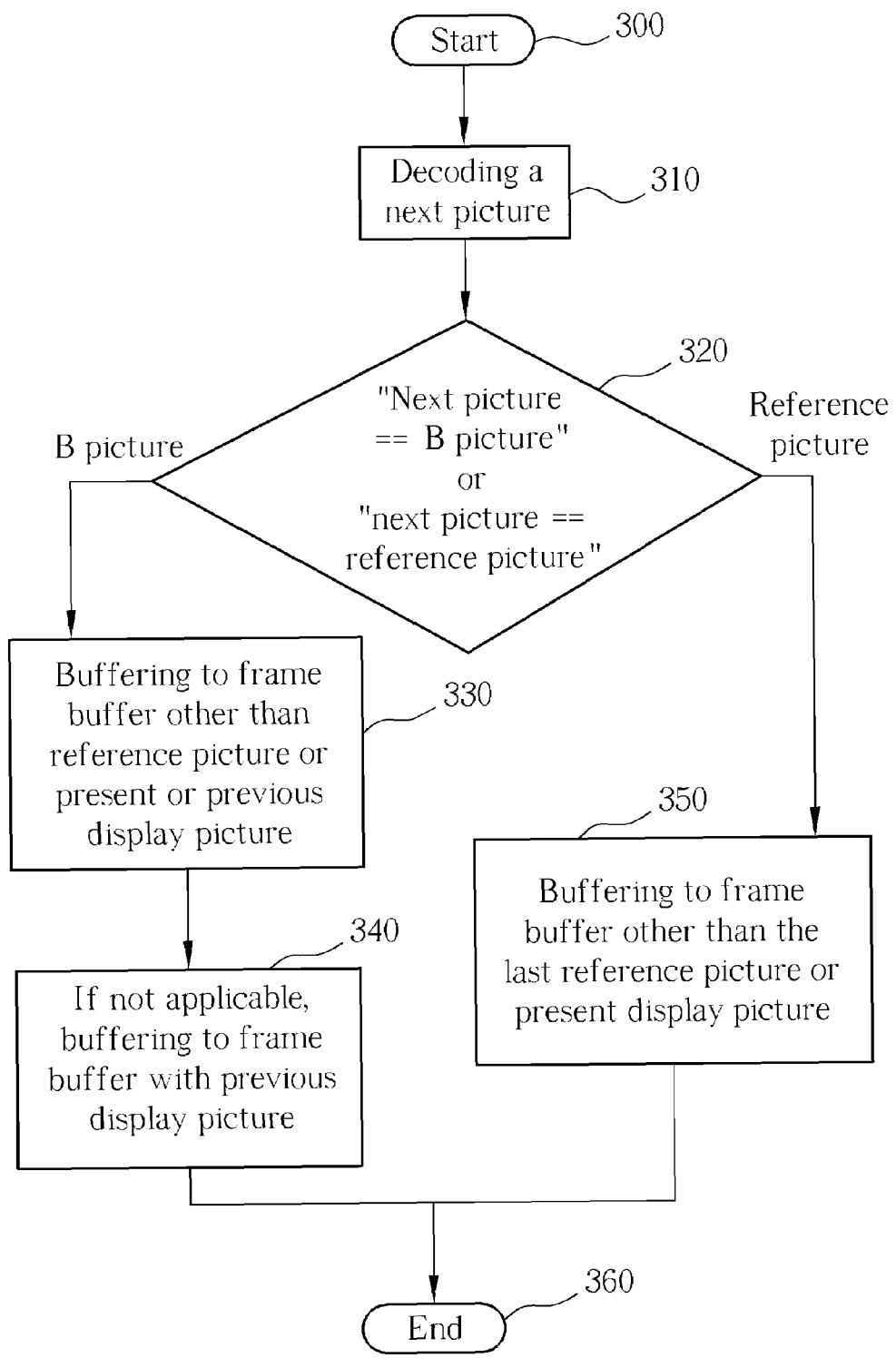
FIG. 3 is a flow chart indicating operations of the apparatus according to the present invention.

Please refer to FIG. 3. FIG. 3 shows a flow chart indicating operations of the apparatus 200 according to the present invention. The present invention method comprises the following steps:

Step 300: Start.

Step 310: Decoding video data of a next picture inputted from a video source with the video decoder 210.

Step 320: Judging with the controller 240 if the next picture decoded in step 310 is a B picture or a reference picture (that is, an I picture or a P picture). If the next picture is a B picture, perform step 330. If the next picture is a reference picture, perform step 350.

Step 330: Buffering the decoded video data of the next picture into a frame buffer 222 of the storage device 220 not stored with a reference picture nor a present display picture nor a previous display picture.

Step 340: If the condition in step 330 is not applicable, buffering the decoded video data of the next picture into a frame buffer 222 of the storage device 220 stored with the previous display picture.

Step 350: Buffering the decoded video data of the next picture into a frame buffer 222 of the storage device 220 not stored with the last decoded reference picture nor the present display picture.

Step 360: End.

Please note that as has been well know in the art, a picture (either a B picture, an I picture, or a P picture) referred to in the present invention method can be regarded as a video frame data, or a video field data that contributes to half of a frame data, either a top field or a bottom field of the frame. For the situation when a next picture decoded is a video field, if the next picture decoded is a field (either a top or a bottom field) of a video frame whereof the other field of the same video frame has not yet been decoded, the present invention method shown in FIG. 3 can be directly performed, while if the next picture decoded is a field (either a top or a bottom field) of a video frame whereof the other field of the same video frame has already been decoded, the next picture decoded can be buffered into the frame buffer previously buffered with the other field of the same video frame.

By adopting the method shown in the above paragraph and in FIG. 3, the present invention apparatus 200 for video decoding and de-interlacing is capable of performing MPEG type video decoding and interlaced/progressive conversion utilizing only a shared storage device having four frame buffers, instead of two separate memories dedicated to the decoder and the converter, respectively, as shown in the prior art.

Please refer to FIG. 4 and FIG. 5 that show two tables indicating decoded video frame buffering strategy according to the present invention.

FIG. 4 lists all possible buffering situations in the frame buffers 222 of the storage device 220 when the next picture decoded is a reference picture (i.e., an I picture or a P picture). When considering the next picture and previous three latest decoded pictures, there are eight different possible decoding sequencing situations in FIG. 4, which are the situations of RRRR, RRBR, RBRR, RBBR, BRRR, BRBR, BBRR, and BBBR. Please note that in FIG. 4 an R represents a reference picture while a B represents a B picture, and the number following an R or a B indicates the order of said R or said B in the decoding sequence. Also note that the notation of B . . . B1 means a plurality of consecutive B pictures decoded directly prior to B1.

Take the situation of R1R2R3R4 as an example, the previous three latest decoded pictures and the next picture in the decoding sequence are respectively R1, R2, R3, and R4. Consequently the present display picture R2, the previous display picture R1, and the last reference picture R3 are stored in three of the four frame buffers 222 of the storage device 220. Therefore, when the next picture R4 is decoded by the video decoder 210, according to the present invention method shown in FIG. 3 (step 350) the next picture R4 can be buffered into the remaining one frame buffer 222 of the storage device 220, as shown in FIG. 4.

Another example can be shown by examining the situation of B1R2B3R4. Similar to the previous example, the previous three latest decoded pictures and the next picture in the decoding sequence are respectively B1, R2, B3, and R4. Also, note that a reference picture R0 appeared before B1 in the decoding sequence is also presented in FIG. 4. Consequently the present display picture B3, the previous display picture R0, and the last reference picture B2 are stored in three of the four frame buffers 222 of the storage device 220. Therefore, when the next picture R4 is decoded by the video decoder 210, according to the present invention method shown in FIG. 3 (step 350) the next picture R4 can be buffered into the remaining one frame buffer 222 of the storage device 220, as shown in FIG. 4.

All the other situations shown in FIG. 4 can be analyzed similar to the above two examples for those who are skilled in the art to understand that by performing the present invention method in FIG. 3, when the next picture decoded is a reference picture, there will always be one frame buffer available (i.e., the remaining frame buffer) for buffering the next picture.

In contrast to FIG. 4, FIG. 5 lists all possible buffering situations in the frame buffers 222 of the storage device 220 when the next picture decoded is a B picture. When considering the next picture and previous three latest decoded pictures, there are eight different possible decoding sequencing situations in FIG. 5, which are the situations of RRRB, RRBB, RBRB, RBBB, BRRB, BRBB, BBRB, and BBBB. Similar to the convention in FIG. 4, in FIG. 5 an R represents a reference picture while a B represents a B picture, and the number following an R or a B indicates the order of said R or said B in the decoding sequence. The notation of B . . . B1 also means a plurality of consecutive B pictures decoded directly prior to B1 (in certain situation, also directly prior to R1).

Take the situation of R1R2R3B4 as an example, the previous three latest decoded pictures and the next picture in the decoding sequence are respectively R1, R2, R3, and B4. Consequently the present display picture R2, the previous display picture R1, and the last two reference pictures R3, R2 are stored in three of the four frame buffers 222 of the storage device 220 (note that R2 is repetitively categorized as the present display picture and the last two reference picture). Therefore, when the next picture B4 is decoded by the video decoder 210, according to the present invention method shown in FIG. 3 (step 330) the next picture R4 will be buffered into the remaining one frame buffer 222 of the storage device 220, as shown in FIG. 5.

Another example can be shown by examining the situation of B1B2B3B4. Similar to the previous example, the previous three latest decoded pictures and the next picture in the decoding sequence are respectively B1, B2, B3, and B4. Also, note that two reference pictures R-1 and R0 appeared before B1 in the decoding sequence is also presented in FIG. 4. Consequently the present display picture B3, the previous display picture B2, and the last two reference pictures R-1, R0 are stored in the four frame buffers 222 of the storage device 220. Therefore, when the next picture R4 is decoded by the video decoder 210, according to the present invention method shown in FIG. 3 (step 340) the next picture B4 will be buffered into the frame buffer 222 stored with the previous display picture, which in this case is the frame buffer 222 stored with B2, as shown in FIG. 5.

All the other situations shown in FIG. 5 can be analyzed similar to the above two examples for those who are skilled in the art to understand that by performing the present invention method in FIG. 3, when the next picture decoded is a B picture, there will always be one frame buffer available (i.e., the remaining frame buffer or the frame buffer with B2, in accordance with different situations) for buffering the next picture.

Among all the situations defined in FIG. 4 and FIG. 5, there are two situations RBBB and BBBB, where the next picture decoded is buffered into the frame buffer stored with the previous display picture. In order to preserve information for both the present display picture and the previous display picture at any given time, particularly in the above-mentioned two situations, the present invention apparatus 200 is capable of buffering a decoded next picture into a frame buffer following a display operation performed on the video data presently stored in the frame buffer. That is, the video data stored in the frame buffer has been displayed before it is substituted by the buffering data of the decoded next picture. In other word, the buffering operation of the decoded next picture never precedes the displaying operation of the presently stored video data.

In another embodiment of the present invention video decoding method as previously exemplified by FIG. 4 and FIG. 5, for the situations presented in FIG. 4, where the next picture decoded is a reference picture, instead of buffering the next decoded picture into the remaining picture the next decoded picture can also be buffered into the frame buffer 222 presently buffered with the previous display picture according to the present invention method. In order to accomplish this implementation, An apparatus 200 having a high-speed decoder 210 or an apparatus 200 capable of buffering the decoded next picture into a frame buffer following a display operation, as described in the last paragraph, is required.

By utilizing the present invention method depicted above, the present invention apparatus 200 is capable of performing motion adaptive de-interlacing operations incorporating video data of 3 through at most 8 fields stored in the frame buffers 222 of the storage device 220, since the storage device 220 has four frame buffers 222 (i.e., eight fields) stored with video data of consecutive video frames.

The present invention apparatus 200 is also capable of performing recovery operations to video data from a telecine source because information for both the present display picture and the previous display picture are preserved in the frame buffers 222 of the storage device 220 at any given time. A movie film video data being converted through the 3-2 pull-down operation shows field combining phenomenon in two out of five video frames. That is, a video frame showing field combining phenomenon incorporates two video fields extracted from two consecutive different film frames. By using information of a present and a previous display picture, video data from a telecine source can be detected, recovered, and displayed by the present invention apparatus 200.

In contrast to the prior art, the present invention method and apparatus utilize a shared storage device having only four frame buffers between the video decoder and the interlace/progressive converter. By performing the present invention method, the present invention decoding and de-interlacing apparatus is capable of accomplishing advanced de-interlacing operations such as motion-adaptive de-interlacing or 3-2 pull-down recovery operations with a lower hardware requirement than the prior art decoding and de-interlacing apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for video decoding in a video decoding/de-interlacing display apparatus, utilizing a storage device having four frame buffers, the method comprising:

(a) decoding video data of a next picture;

(b) if the next picture is a B picture, buffering the decoded video data of the next picture into a frame buffer of the storage device not stored with a reference picture nor a present display picture nor a previous display picture; and (c) if step (b) is not applicable, buffering the decoded video data of the next picture into a frame buffer of the storage device stored with the previous display picture.

2. The method of claim 1, further comprising:

(d) if the decoded next picture is a reference picture, buffering the decoded video data of the next picture into a frame buffer of the storage device not stored with a last decoded reference picture nor the present display picture nor the previous display picture.

3. The method of claim 2, wherein the reference picture is an I picture.

4. The method of claim 2, wherein the reference picture is a P picture.

5. A method for video decoding in a video decoding/de-interlacing display apparatus, utilizing a storage device having four frame buffers, the method comprising:

(a) decoding video data of a next picture; and (b) if the next picture is a reference picture, buffering the decoded video data of the next picture into a frame buffer of the storage device not stored with a last decoded reference picture nor a present display picture nor a previous display picture.

6. The method of claim 5, wherein the reference picture is an I picture.

7. The method of claim 5, wherein the reference picture is a P picture.

8. The method of claim 5, further comprising:

(c) if the next picture is a B picture, buffering the decoded video data of the next picture into a frame buffer of the storage device not stored with a reference picture nor the present display picture nor the previous display picture.

9. The method of claim 8, further comprising:

(d) if step (c) is not applicable, buffering the decoded video data of the next picture into a frame buffer of the storage device stored with the previous display picture.

10. An apparatus for video decoding and de-interlacing, comprising:

a video decoder for decoding video data to generate decoded video data of a next picture;

a storage device coupled to the video decoder, the storage device having four frame buffers for buffering the decoded video data of the next picture into one of the four frame buffers according to data stored in the frame buffers;

an interlace/progressive converter coupled to the storage device, for de-interlacing data stored in the frame buffers to generate corresponding progressive video data according to a first picture and a second picture, wherein the second picture is adjacent to the first picture in display order and one of the first and second pictures is a present display picture; and a controller coupled to the video decoder and the interlace/progressive converter, for controlling data access of the video decoder and the interlace/progressive converter to the frame buffers of the storage device.

11. The apparatus of claim 10, wherein the controller controls the data access of the video decoder according to following principles:

(a) if the next picture is a B picture, buffering the decoded video data of the next picture into a frame buffer of the storage device not stored with a reference picture nor the present display picture nor a previous display picture; and (b) if step (a) is not applicable, buffering the decoded video data of the next picture into a frame buffer of the storage device stored with the previous display picture.

12. The apparatus of claim 10, wherein the controller controls the data access of the video decoder according to following principles:

if the next picture is a reference picture, buffering the decoded video data of the next picture into a frame buffer of the storage device not stored with a last decoded reference picture nor the present display picture nor a previous display picture.

13. The apparatus of claim 10, wherein the interlace/progressive converter is capable of performing motion adaptive de-interlacing operations.

14. The apparatus of claim 13, wherein the interlace/progressive converter performs the motion adaptive de-interlacing operations incorporating video data of 3-8 fields stored in the frame buffers of the storage device.

15. The apparatus of claim 10, wherein the apparatus is capable of performing recovery operations to video data from a telecine source.

16. The apparatus of claim 10, wherein another one of the first or second picture other than the present display picture is a previous display picture.

17. A method for video decoding in a video decoding/de-interlacing display apparatus, utilizing a storage device having four frame buffers, the method comprising:

decoding video data of a next picture;

buffering the decoded video data of the next picture into one of the four frame buffers according to data stored in the frame buffers;

de-interlacing data stored in the frame buffers to generate corresponding progressive video data according to a first picture and a second picture, wherein the second picture is adjacent to the first picture in display order and one of the first and second pictures is a present display picture; and controlling data access to the frame buffers of the storage device during decoding and de-interlacing.

18. The method of claim 17, wherein controlling data access comprises:

(a) if the next picture is a B picture, buffering the decoded video data of the next picture into a frame buffer of the storage device not stored with a reference picture nor the present display picture nor a previous display picture; and (b) if step (a) is not applicable, buffering the decoded video data of the next picture into a frame buffer of the storage device stored with the previous display picture.

19. The method of claim 17, wherein controlling data access comprises:

if the next picture is a reference picture, buffering the decoded video data of the next picture into a frame buffer of the storage device not stored with a last decoded reference picture nor the present display picture nor a previous display picture.

20. The method of claim 17, wherein the interlace/progressive converter is capable of performing motion adaptive de-interlacing operations.

21. The method of claim 20, wherein the interlace/progressive converter performs the motion adaptive de-interlacing operations incorporating video data of 3-8 fields stored in the frame buffers of the storage device.

22. The method of claim 17, wherein another one of the first or second picture other than the present display picture is a previous display picture.

* * * * *